(12) United States Patent  
Rosenberg

(10) Patent No.: US 7,532,632 B2
(45) Date of Patent: May 12, 2009

(54) METHOD FOR CONTROLLING MEMORY CONSUMPTION IN ROUTER-BASED VIRTUAL PRIVATE NETWORKS

(75) Inventor: Eric Rosenberg, Lincroft, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 603 days.

(21) Appl. No.: 11/178,178

(22) Filed: Jul. 8, 2005

(65) Prior Publication Data

US 2007/0008901 A1 Jan. 11, 2007

(51) Int. Cl.
*H04L 12/28* (2006.01)
(52) U.S. Cl. .................... 370/401; 370/252; 370/254; 711/1
(58) Field of Classification Search .............. None
See application file for complete search history.

(56) References Cited

U.S. PATENT DOCUMENTS

| 6,212,558 | B1 | 4/2001 | Antur et al. |
| 6,226,751 | B1 | 5/2001 | Arrow et al. |
| 6,594,704 | B1 | 7/2003 | Birenback et al. |
| 6,795,399 | B1 | 9/2004 | Benmohamed et al. |
| 2005/0068961 | A1* | 3/2005 | Raghunath et al. ....... 370/395.2 |

* cited by examiner

*Primary Examiner*—Duc C Ho
(74) *Attorney, Agent, or Firm*—Hanley Flight & Zimmerman, LLC

(57) ABSTRACT

A method to determine the maximum number of VPNs assignable to plurality of routers in a VPN network. The first step in the method can be specifying a tolerance which is a probability that consumed router memory will exceed available router memory for each router in a plurality of routers. The second step can be computing the consumed router memory on each router in a plurality of routers by summing a route memory, an interface memory, a VPN memory, and a constant memory. The third step can be computing a number [V] of VPNs assigned to the router to insure that, with the specified probability tolerance, the consumed router memory will not exceed the available router memory for each router in a plurality of routers.

22 Claims, 4 Drawing Sheets

METHOD FOR CONTROLLING MEMORY CONSUMPTION IN ROUTER-BASED VIRTUAL PRIVATE NETWORKS

FIELD

The present embodiments relate generally to a method for determining the number of Virtual Private Networks (VPNs) that can be assigned to a router without exhausting the router memory.

BACKGROUND

Currently there is no way to determine how many customers should be provisioned on a router by a service provider implementing Virtual Private Network (VPN) services. If too many customers are assigned to a router, the required memory will exceed the router memory, and extra routers must be deployed. The expected commercial benefit is cost reduction. A fully loaded Cisco GSR router costs nearly $1 Million after all the financial loading which includes: office engineering and installation.

Each router with an interface for a VPN must store the entire routing table for that VPN. The largest VPNs consume about 5% of the memory on a Cisco GSR router to which the VPN is assigned. Avoiding having to provision a VPN on two routers can thus save 5% of the memory on the second router which translates to a 5% reduction of the cost of a $1 million router or $50,000. If there are 30 locations and the largest VPN can be provisioned on only one router in the 30 locations, the savings for this VPN alone can be estimated as (30)($50,000) or $1.5 Million. Saving memory means saving money.

There is a need for a method of determining how many customers can be assigned to a router so that with a high probability the assigned VPNs will not exceed the router's memory.

SUMMARY

The embodiments of the invention are a method to determine the maximum number of Virtual Private Networks assignable to plurality of routers in a service provider network implementing Virtual Private Network services. The first step in the method can be to create a tolerance. The tolerance is a probability that consumed router memory will exceed available router memory for each router in a plurality of routers.

The next step in an embodiment can be to compute the consumed router memory on each router in a plurality of routers by summing a route memory, an interface memory, a VPN memory, and a constant memory. The constant amount of memory is independent of the route memory, the interface memory and the VPN memory. The VPN memory can be independent of the number of routes and interfaces for the VPN.

Another step in the method can be computing a number [V] of VPNs assignable to the router to insure that consumed router memory will not exceed the available router memory for each router in a plurality of routers, by solving a nonlinear equation that expresses the consumed router memory as a function of [V]. The nonlinear equation can be solved by using the quadratic formula or by using Newton's method.

BRIEF DESCRIPTION OF THE DRAWINGS

The detailed description will be better understood in conjunction with the accompanying drawings as follows.

Figure 1:
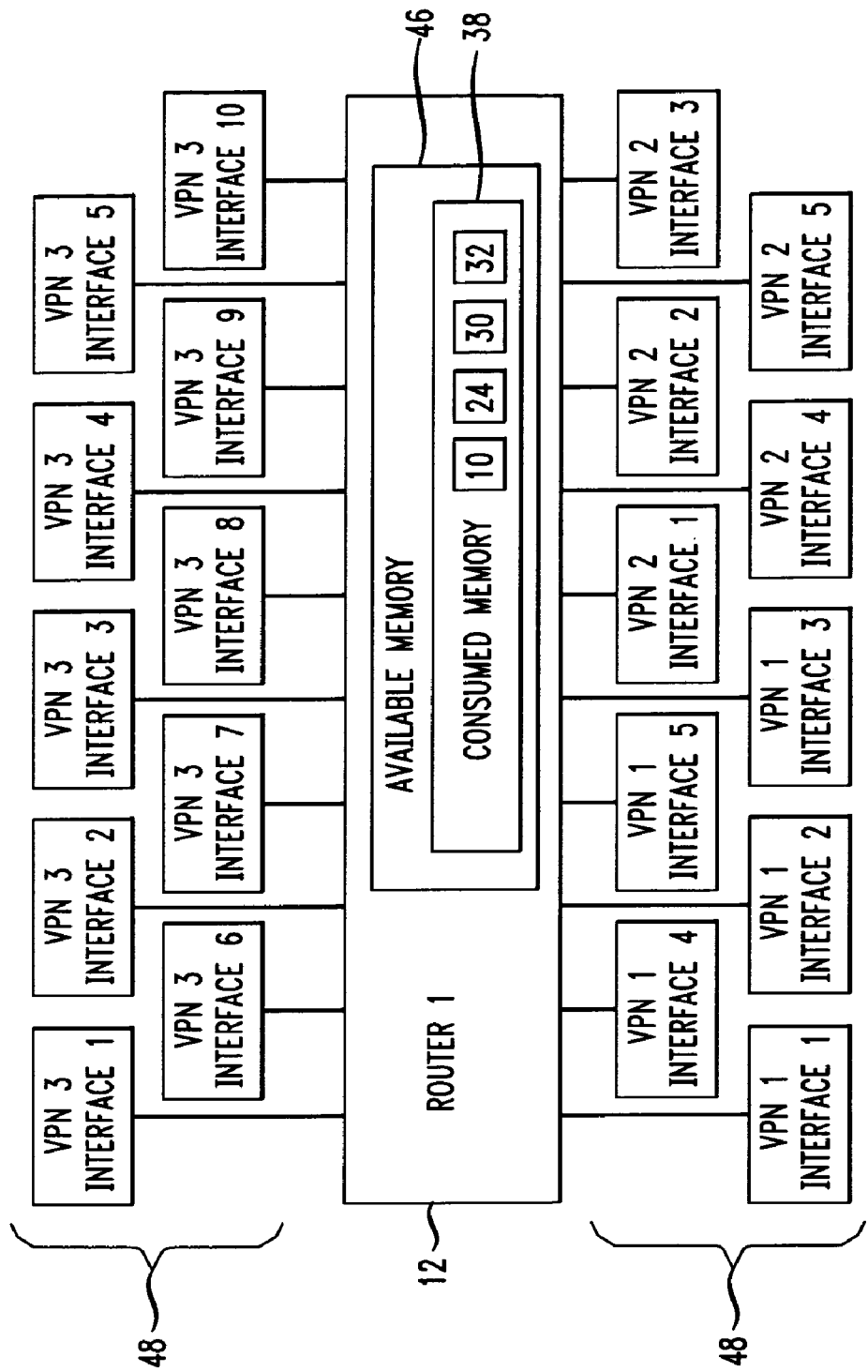
FIG. 1 depicts Virtual Private Network interfaces assigned to a single router.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments of the invention can be for a method of determining how many customers can be assigned to a router that is being used to provide Virtual Private Network (VPN) services. The router can be an edge router, and an edge router is a router to which customers connect.

The method can apply to the problem of assigning interfaces to a Private Edge Router (PER). Since a customer might have multiple VPNs, the problem can be in terms of assigning multiple VPNs to PERs rather than assigning customers to PERs.

The embodiments of the invention allow the assigning of VPNs to a router so that, with a high probability, the router memory will not be exhausted while allowing additional interfaces to be provisioned for the VPNs assigned to the router in a given location without requiring a second router in that location.

The embodiments of the method control costs for a telecommunications service provider. The service provider's costs are minimized by predicting the maximum number of VPNs per router while insuring a low probability of exhausting the router's capabilities. This aspect enables the design of an optimal VPN network based on memory constraints and maximum number of VPNs for a router.

The embodiments of the method enable VPNs to grow on a network without exhausting the memory on a router, and without having to reassign the VPN to another router. Assigning a VPN to a new router causes service disruptions for the VPN. An example of a service disruption occurs if a customer such as a Hospital needs to add additional interfaces to their VPN and the additional interfaces are beyond the capacity of the router to which the Hospital is currently assigned. In this situation, the Hospital will experience a service disruption while its interfaces are reassigned to another router with sufficient interfaces, or the Hospital's VPN will consume memory on a second router to which the additional interfaces are connected. Death or further injury can result from a Hospital not having access to its computer network. The embodiments determine the best use of routers to prevent a customer's VPN from having to be moved to a different router, causing service interruptions, or having to install additional routers.

The embodiments of the method can be used to determine the maximum number of VPNs assignable to a plurality of routers in a VPN network. The router can be a telecommunications network router, such as a model XFL or GSR available from Cisco Systems, Inc. located in San Jose, Calif.

A step in the method can be creating a tolerance. The tolerance is a probability that consumed router memory will exceed available router memory for each router in a plurality of routers. The tolerance can be a parameter [α] which is less than 1 and greater than zero.

A threshold [δ] can also be created such that F(δ)≧1−α, wherein F(δ) is the cumulative probability that a Normal random variable, with mean 0 and variance 1, is less than [δ].

Another step in the method can be computing the consumed router memory on each router in a plurality of routers. The consumed router memory can be computed by summing a route memory, an interface memory, a VPN memory, and a constant memory. The constant amount of memory can be independent of the route memory, the interface memory and the VPN memory. The VPN memory can be independent of the number of routes and interfaces for the VPN.

The route memory can be determined for each router in a plurality of routers in a VPN network by determining a total number of routes over all VPNs that are assigned to a router and multiplying the total number of routes by memory per route. The total number of routes per VPN can be a random variable with a given mean and variance. The mean and variance are determined by analyzing the number of routes for the plurality of VPNs in the VPN network.

The interface memory for each router in a plurality of routers in a VPN network can be determined by computing an average number of interfaces per VPN per router, then multiplying the average number of interfaces per VPN per router by the number of VPNs that are assigned to a router to obtain the total number of interfaces, and multiplying the total number of interfaces by the memory per interface.

The VPN memory for each router in a plurality of routers in a VPN network can be determined by computing an average VPN memory averaged over the plurality of VPNs in the network, then multiplying the average VPN memory by the number of VPNs that are assigned to a router.

The constant memory for each router in a plurality of routers in a VPN network can be determined by computing an average constant memory per router averaged over the plurality of routers in the network.

Another step in the method can be computing a number [V] of VPNs assigned to the router to insure that consumed router memory will not exceed the available router memory for each router in a plurality of routers. The available router memory can be the total memory available in each router in the VPN network.

The number [V] can be computed by the quadratic formula, or by applying Newton's method for solving nonlinear equations, to solve for [V] in an equation that expresses the consumed router memory as a function of [V].

Rather than trying to estimate the distribution of interfaces per VPN per router to compute the number [V], it can be assumed that the number of interfaces per VPN per router is [P]. With this assumption, the total number of interfaces per router can be V·P. The number of interfaces per VPN per router can also be treated as a random variable p(v).

The parameter $[M_p]$ is the memory per interface, $[M_v]$ is the memory per VPN, $[M_r]$ is the memory per route, $[A]$ is available memory, and $[M_0]$ is the constant memory per router. We assume that there is a random variable r(v) which is the number of routes per VPN. When there is a set [S] of VPNs on the router and the number of VPNs in the set [S] is [V] then the optimization is accomplished by determining the largest [V] such that:

$$\text{probability}\left\{M_0 + M_r \sum_{v \in S} r(v) + M_p \cdot V \cdot P + M_v \cdot V \leq A\right\} \geq 1 - \alpha$$

We assume that:

$$M_r \sum_{v \in S} r(v)$$

is approximately distributed as $N(M_r \cdot V \cdot \mu_r, M_r^2 \cdot V \cdot \sigma_r^2)$, where $N(M_r \cdot V \cdot \mu_r, M_r^2 \cdot V \cdot \sigma_r^2)$ represents a Normal distribution with mean $(M_r \cdot V \cdot \mu_r)$ and variance $(M_r^2 \cdot V \cdot \sigma_r^2)$ and where $\mu_r$ is the mean of the random variable r(v) and $\sigma_r$ is the standard deviation of the random variable r(v). Using this Normal approximation, the quantity $$\frac{\left(M_r \sum_{v \in S} r(v)\right) - M_r \cdot V \cdot \mu_r}{M_r \cdot \sigma_r \cdot \sqrt{V}}$$

is (approximately) distributed as a Normal random variable with mean 0 and variance 1.

F(x) can be the cumulative density function of a standardized normal random variable; in other words, F(x) can be the cumulative probability that a normal random variable, with mean 0 and variance 1, is less than x.

Using the Normal approximation, $$\text{probability}\left\{M_0 + M_r \cdot \sum_{v \in S} r(v) + M_p \cdot V \cdot P + M_v \cdot V \leq A\right\} = \text{probability}\left\{M_r \cdot \sum_{v \in S} r(v) \leq A - M_0 - V(M_p \cdot P + M_v)\right\}$$

$$= \text{probability}\left\{\frac{M_r \cdot \sum_{v \in S} r(v) - M_r \cdot V \cdot \mu_r}{M_r \cdot \sigma_r \cdot \sqrt{V}} \leq \frac{A - M_0 - V(M_p \cdot P + M_v) - M_r \cdot V \cdot \mu_r}{M_r \cdot \sigma_r \cdot \sqrt{V}}\right\}$$

$$\approx F\left(\frac{A - M_0 - V(M_p \cdot P + M_v) - M_r \cdot V \cdot \mu_r}{M_r \cdot \sigma_r \cdot \sqrt{V}}\right)$$

$$= F\left(\frac{A - M_0 - V(M_p \cdot P + M_v + M_r \cdot \mu_r)}{M_r \cdot \sigma_r \cdot \sqrt{V}}\right)$$

Let δ satisfy $F(\delta) \geq 1 - \alpha$

For example, α=0.8414 yields 1−α=0.1586 and δ=1 (one standard deviation), and α=0.02274 yields 1−α=0.97726 and δ=2 (two standard deviations). Hence the required V is obtained by solving $$\delta = \frac{A - M_0 - V(M_p \cdot P + M_v + M_r \cdot \mu_r)}{M_r \cdot \sigma_r \cdot \sqrt{V}}$$

which can be rewritten as the nonlinear equation:

$V(M_p \cdot P + M_v + M_r \cdot \mu_r) + \delta \cdot M_r \cdot \sigma_r \cdot \sqrt{V} + M_0 - A = 0.$ The optimal value of the variable [V] can be obtained by applying the quadratic formula, after substituting x for $\sqrt{V}$, resulting in the following equation:

$x^2(M_p \cdot P + M_v + M_r \cdot \mu_r) + \delta \cdot M_r \cdot \sigma_r \cdot x + M_0 - A = 0$ Defining the constants a, b, and c, wherein, $a = M_p \cdot P + M_v + M_r \cdot \mu_r$ $b = \delta \cdot M_r \cdot \sigma_r$ $c = A - M_0$ The constants are used to solve the quadratic equation $a \cdot x^2 + b \cdot x - c = 0$ which results in $$x = \frac{-b + \sqrt{b^2 + 4 \cdot a \cdot c}}{2 \cdot a},$$

and wherein the number [V] of VPNs assignable to the router is $V = x^2$.

Alternatively [V] can be solved by applying Newton's method to solve the equation $V(M_p \cdot P + M_v + M_r \cdot \mu_r) + \delta \cdot M_r \cdot \sigma_r \cdot \sqrt{V} + M_0 - A = 0$.

When applying Newton's method, the constants can be defined as:

$a = M_p \cdot P + M_v + M_r \cdot \mu_r$ $b = \delta \cdot M_r \cdot \sigma_r$ $c = A - M_0$ The equation to be solved by Newton's method can be written as $g(V) = 0$, where $g(V) = aV + b\sqrt{V} - c = 0$ and the derivative of $g(V)$ is $$g'(V) = a + \frac{b}{(2\sqrt{V})}.$$

Starting with some $V_0$, the iteration of Newton's method can be written as $$V_{i+1} = V_i - \frac{g(V_i)}{g'(V_i)}.$$

The initial value for $V_i$ can be $V_0 = c/a$.

With reference to the figures, FIG. 1 depicts Virtual Private Networks interfaces assigned to a single router (12). Even though a router, such as a Cisco XFL, can handle hundreds of Virtual Private Networks (48), only three are depicted. To create a Virtual Private Network on a plurality of routers, memory is used on the routers to store information about the customer Virtual Private Network.

The router (12) in this figure has available memory (46). Once the consumed memory (38) reaches the amount of available memory (46), no more Virtual Private Networks (48) or interfaces for existing Virtual Private Networks can be added to the router until some of the interfaces or Virtual Private Networks on the router are removed. The consumed memory (38) comprises the constant amount of memory (10), the route memory (24), the interface memory (30) and the VPN memory (32).

Figure 2:
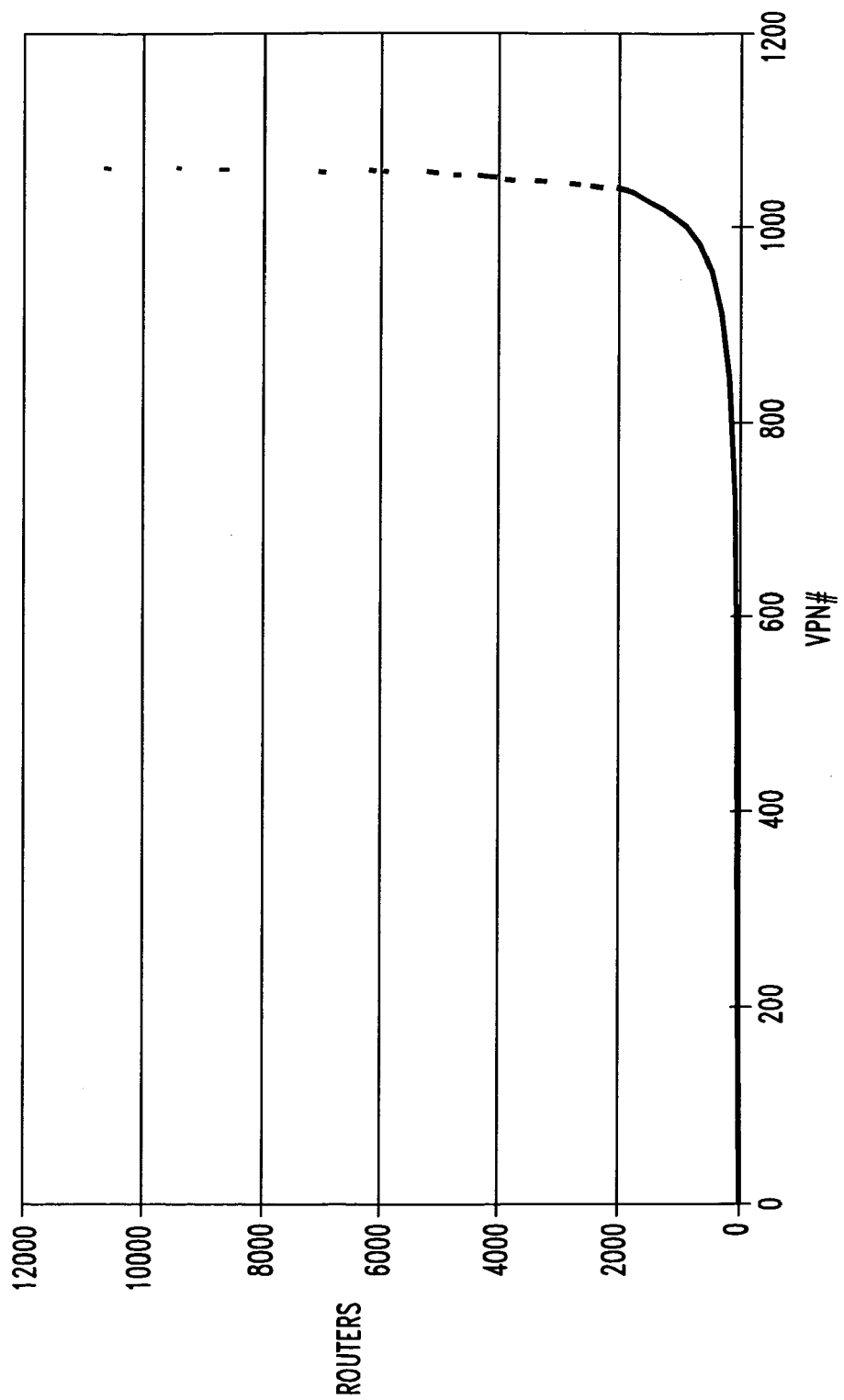
FIG. 2 depicts a graph of the quantity of routes per VPN for a large set of customer VPNs.

FIG. 2 depicts a graph of the quantity of routes per VPN for a large set of customer VPNs.

Figure 3:
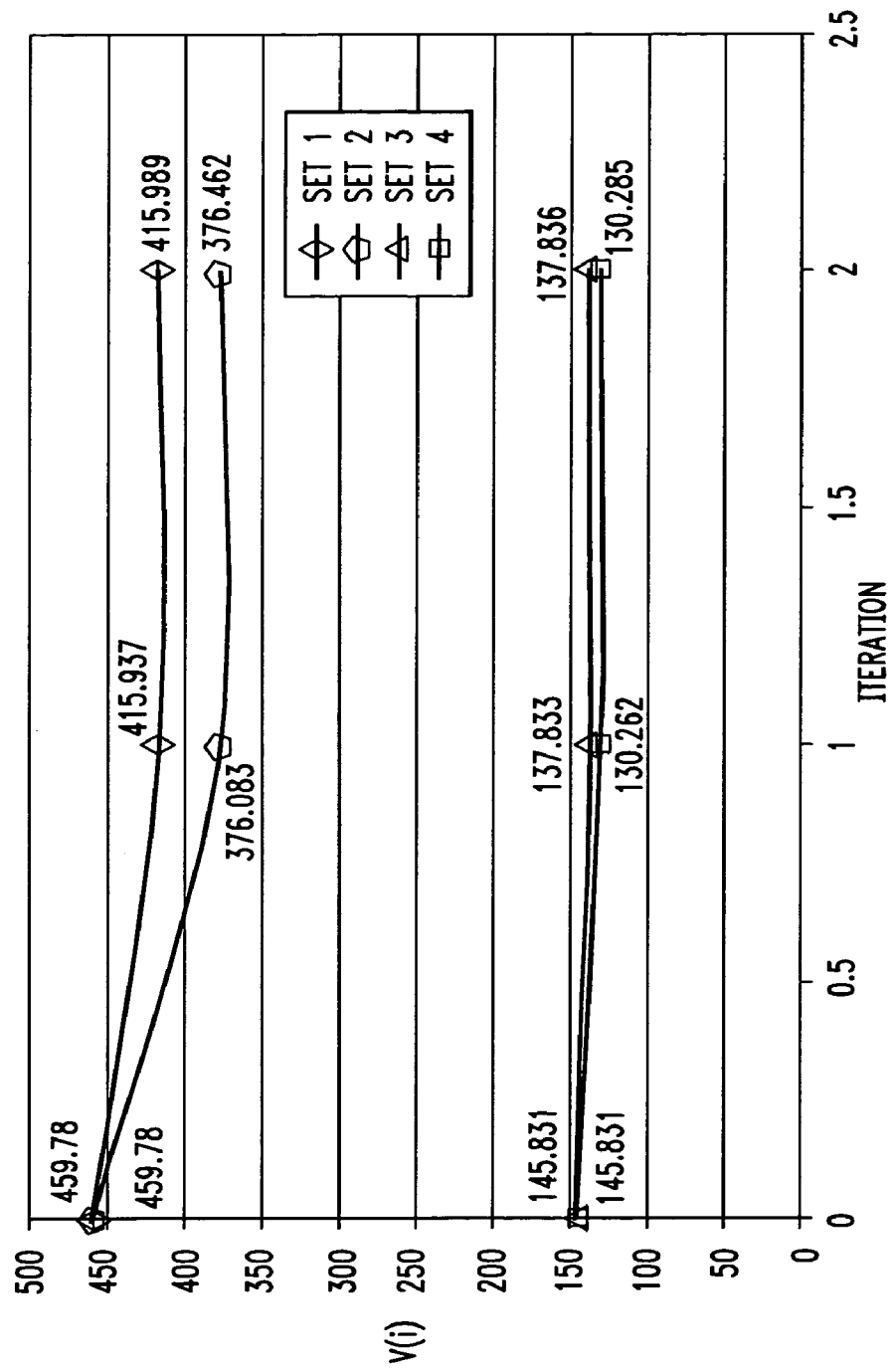
FIG. 3 depicts a graph of examples of the convergence of the values of [V] obtained by using Newton's method.

FIG. 3 depicts a graph of four examples of determining the maximum number [V] of Virtual Private Networks. The four sets of variables chosen are Set 1: P=3 and δ=1, Set 2: P=3 and δ=2, Set 3: P=30 and δ=1, Set 4: P=30 and β=2. The equation $V(M_p \cdot P + M_v + M_r \cdot \mu_r) + \delta \cdot M_r \cdot \sigma_r \cdot \sqrt{V} + M_0 - A = 0$ is solved for each of the four sets of variables using the quadratic formula. As can be seen on the graph, the actual number of Virtual Private Networks that can be used if there are 3 interfaces [P] per VPN is 415 when the probability threshold is 1-F(δ) where δ=1. The value 415 is a much lower number than the initial guess for [V] of 459.78. If δ is increased to 2 as depicted by Set 2 and [P] remains at the value 3, the number of the Virtual Private Networks that can be assigned to the router decreases to 376. The decrease in the probability threshold from 1-F(1) to 1-F(2), increases the probability that the number [V] of Virtual Private Networks assigned to the router will not exhaust the router's resources.

As can be seen on FIG. 3, when [P] equals 30 and δ=1 the maximum number of Virtual Private Networks that can be assigned is 137. This value is a much lower number than the initial guess for [V] of 145.831. If δ is increased to 2 and [P] remains at 30, the number of the Virtual Private Networks that can be assigned to a router decreases to 130.

Figure 4:
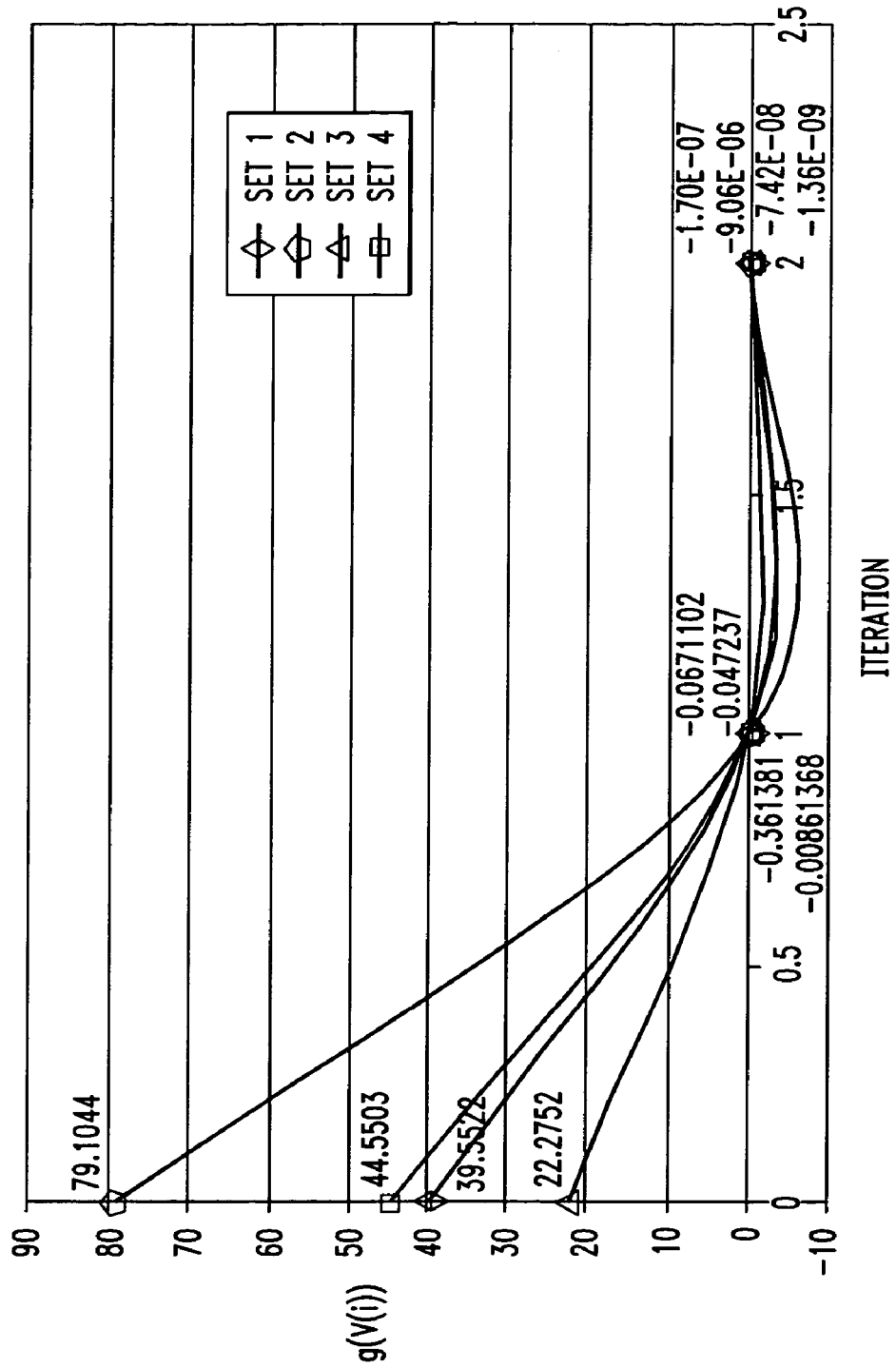
FIG. 4 depicts a graph of examples of the convergence of the values of the derivative g'(V) obtained by using Newton's method.

FIG. 4 depicts a graph of examples of the convergence of the values of the derivative g'(V) obtained by using Newton's method. After just the second Newton iteration, the derivatives in each of the four sets approach the number zero, indicating that the method has converged.

While these embodiments have been described with emphasis on the embodiments, it should be understood that within the scope of the appended claims, the embodiments might be practiced other than as specifically described herein.

What is claimed is:

1. A method to determine a maximum number of VPNs assignable to each router in a plurality of routers in a VPN network comprising the steps of:
   a. computing consumed router memory for each router in the plurality of routers by summing a route memory, an interface memory, a VPN memory, and a constant memory, wherein the amount of constant memory is independent of the route memory, the interface memory and the VPN memory, and wherein the VPN memory is independent of the number of routes and interfaces for the VPN; and
   b. computing the maximum number V of VPNs assignable to each router to ensure that the consumed router memory will not exceed the available router memory for each router in the plurality of routers.

2. The method of claim 1, further comprising the step of specifying a tolerance, wherein the tolerance comprises a probability that consumed router memory will exceed available router memory for each router in the plurality of routers, and wherein specifying a tolerance applies α, which is less than 1 and greater than zero.

3. The method of claim 1, wherein the route memory is determined for each router in the plurality of routers in a VPN network by determining a total number of routes over all VPNs that are assigned to a router and multiplying the total number of routes by memory per route.

4. The method of claim 3, wherein the quantity of routes per VPN is a random variable with a given mean and variance, and wherein the mean and variance are determined by analyzing the number of routes for the plurality of VPNs in the VPN network.

5. The method of claim 1, wherein the interface memory for each router in a plurality of routers in a VPN network is determined by computing an average number of interfaces per VPN per router, then multiplying the average number of interfaces per VPN per router by the number of VPNs that are assigned to a router to obtain the total number of interfaces, and multiplying the total number of interfaces by the memory per interface.

6. The method of claim 1, wherein the VPN memory for each router in a plurality of routers in a VPN network is determined by computing an average VPN memory averaged over the plurality of VPNs in the network, then multiplying the average VPN memory by the number of VPNs that are assigned to a router.

7. The method of claim 1, wherein the constant memory for each router in a plurality of routers in a VPN network is determined by computing an average constant memory per router averaged over the plurality of routers in the network.

8. The method of claim 1, wherein the available router memory is total memory available for each router in the VPN network.

9. The method of claim 1, wherein the router is a telecommunications network router.

10. The method of claim 1, wherein the step of computing the number V, further comprises the step of: creating a threshold δ such that, wherein F(δ) is the cumulative probability that a normal random variable, with mean 0 and variance 1, is less than δ.

11. The method of claim 1, wherein the step of computing is by solving for V, in an equation that expresses the consumed router memory as a function of V, wherein the equation is $$V(M_p \cdot P + M_v + M_r \cdot \mu_r) + \delta \cdot M_r \cdot \sigma_r \cdot \sqrt{V} + M_0 - A = 0,$$

and wherein $M_p$ is the memory per interface, P is the average number of interfaces per VPN per router, $M_v$ is the memory per VPN, $M_r$ is the memory per route, $\mu_r$ is the mean of the random variable for the number of routes per VPN, $\sigma_r$ is the standard deviation of the random variable for the number of routes per VPN, A is available memory, and $M_0$ is the constant memory per router.

12. A method to determine a maximum number of VPNs assignable to each router in a plurality of routers in a VPN network comprising the steps of:
   a. computing consumed router memory on each router in the plurality of routers by summing a route memory, an interface memory, a VPN memory, and a constant memory, wherein the amount of constant memory is independent of the route memory, the interface memory and the VPN memory, and wherein the VPN memory is independent of the number of routes and interfaces for the VPN; and
   b. computing the maximum number V of VPNs assignable to each router by specifying a tolerance to ensure that, with the specified tolerance, the consumed router memory will not exceed the available router memory, for each router in the plurality of routers.

13. The method of claim 12, wherein the tolerance comprises a probability that consumed router memory will exceed available router memory for each router in the plurality of routers and the tolerance applies α, which is less than 1 and greater than zero.

14. The method of claim 12, wherein the route memory is determined for each router in the plurality of routers in a VPN network by determining a total number of routes over all VPNs that are assigned to a router and multiplying the total number of routes by memory per route.

15. The method of claim 14, wherein the quantity of routes per VPN is a random variable with a given mean and variance, and wherein the mean and variance are determined by analyzing the number of routes for the plurality of VPNs in the VPN network.

16. The method of claim 12, wherein the interface memory for each router in a plurality of routers in a VPN network is determined by computing an average number of interfaces per VPN per router, then multiplying the average number of interfaces per VPN per router by the number of VPNs that are assigned to a router to obtain the total number of interfaces, and multiplying the total number of interfaces by the memory per interface.

17. The method of claim 12, wherein the VPN memory for each router in a plurality of routers in a VPN network is determined by computing an average VPN memory averaged over the plurality of VPNs in the network, then multiplying the average VPN memory by the number of VPNs that are assigned to a router.

18. The method of claim 12, wherein the constant memory for each router in a plurality of routers in a VPN network is determined by computing an average constant memory per router averaged over the plurality of routers in the network.

19. The method of claim 12, wherein the available router memory is total memory available for each router in the VPN network.

20. The method of claim 12, wherein the router is a telecommunications network router.

21. The method of claim 12, wherein the step of computing the number V, further comprises the step of: creating a threshold δ such that $F(δ) \geq 1 - α$, wherein F(δ) is the cumulative probability that a normal random variable, with mean 0 and variance 1, is less than δ.

22. The method of claim 12, wherein the step of computing is by solving for V in an equation that expresses the consumed router memory as a function of V, wherein the equation is $$V(M_p \cdot P + M_v + M_r \cdot \mu_r) + \delta \cdot M_r \cdot \sigma_r \cdot \sqrt{V} + M_0 - A = 0,$$

and wherein $M_p$ is the memory per interface, P is the average number of interfaces per VPN per router, $M_v$ is the memory per VPN, $M_r$ is the memory per route, $\mu_r$ is the mean of the random variable for the number of routes per VPN, $\sigma_r$ is the standard deviation of the random variable for the number of routes per VPN, A is available memory, and $M_0$ is the constant memory per router.

* * * * *